(12) United States Patent
Querbes et al.

(10) Patent No.: US 11,908,070 B2
(45) Date of Patent: Feb. 20, 2024

(54) DYNAMIC THREE-DIMENSIONAL IMAGING METHOD

(71) Applicants: Olivier Querbes, Vallesvilles (FR); Véronique Querbes-Duret, Vallesvilles (FR)

(72) Inventors: Olivier Querbes, Vallesvilles (FR); Véronique Querbes-Duret, Vallesvilles (FR)

(*) Notice: Subject to any disclaimer, the term of this patent is extended or adjusted under 35 U.S.C. 154(b) by 263 days.

(21) Appl. No.: 17/427,877

(22) PCT Filed: Feb. 3, 2020

(86) PCT No.: PCT/IB2020/050838
§ 371 (c)(1),
(2) Date: Aug. 2, 2021

(87) PCT Pub. No.: WO2020/157733
PCT Pub. Date: Aug. 6, 2020

(65) Prior Publication Data
US 2022/0122318 A1    Apr. 21, 2022

(51) Int. Cl.
*G06T 17/00* (2006.01)
*G06T 7/593* (2017.01)
*G06T 7/90* (2017.01)

(52) U.S. Cl.
CPC .............. *G06T 17/00* (2013.01); *G06T 7/593* (2017.01); *G06T 7/90* (2017.01); *G06T 2207/10024* (2013.01); *G06T 2207/10028* (2013.01); *G06T 2207/20081* (2013.01)

(58) Field of Classification Search
None
See application file for complete search history.

(56) References Cited

U.S. PATENT DOCUMENTS

2017/0004649 A1* 1/2017 Collet Romea ........... G06T 7/33

* cited by examiner

*Primary Examiner* — Kyle Zhai
(74) *Attorney, Agent, or Firm* — CRGO Global; Steven M. Greenberg

(57) ABSTRACT

Disclosed is a dynamic three-dimensional imaging method that allows the generation of a three-dimensional numerical model that represents an observed three-dimensional scene. The generated model optimally combines (404) data from two intermediate three-dimensional numerical models, respectively obtained by a stereoscopic three-dimensional reconstruction calculation method (402) and by a method of three-dimensional reconstruction calculation through learning (403). In addition, each new model that is generated helps to improve the overall performance of the method of three-dimensional reconstruction calculation by learning.

13 Claims, 4 Drawing Sheets

[Fig. 1]
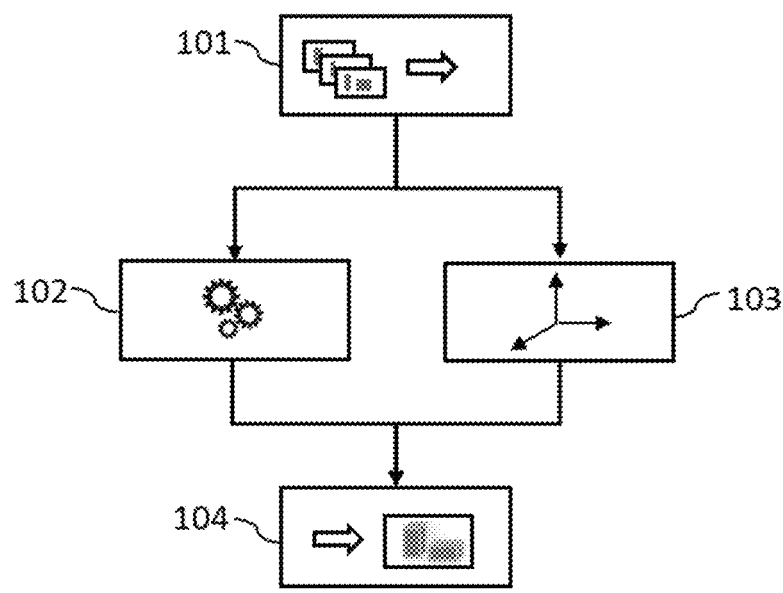
[Fig. 2]
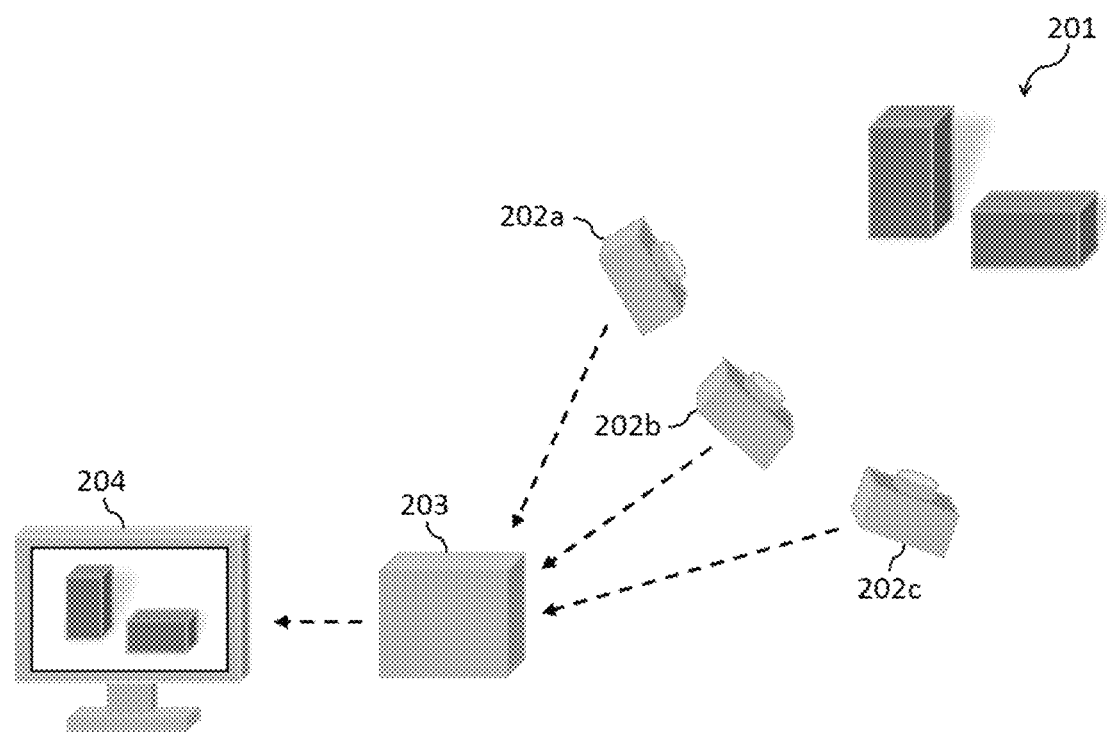

[Fig. 3]
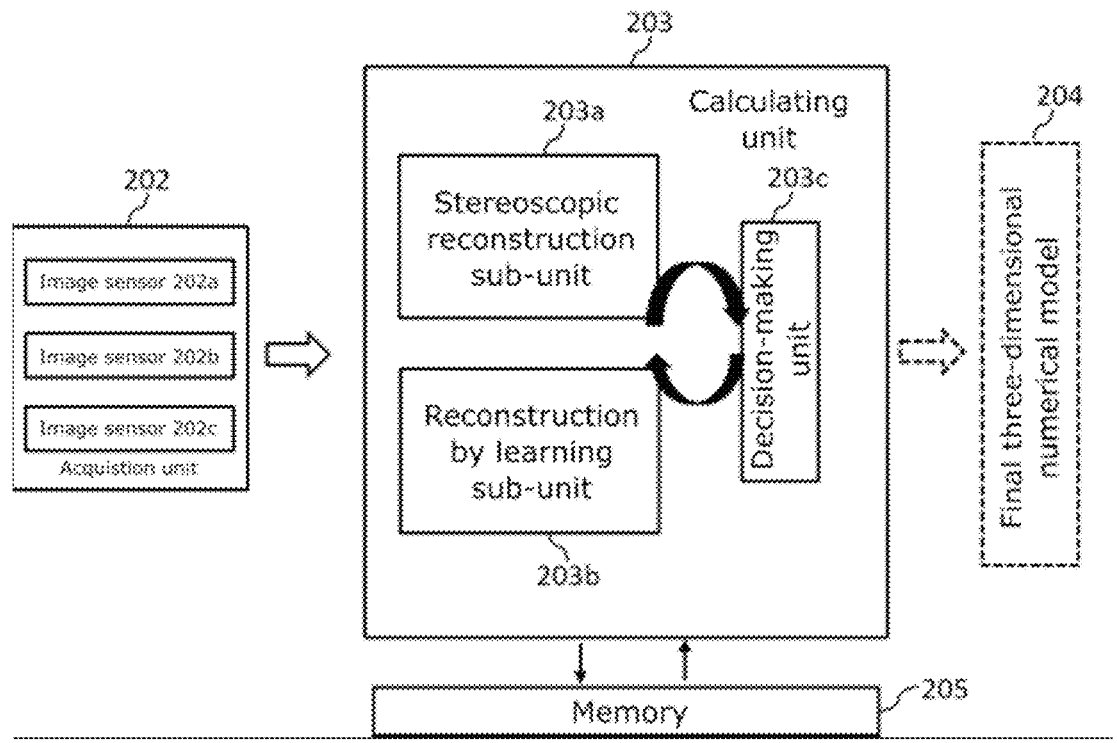
[Fig. 4]
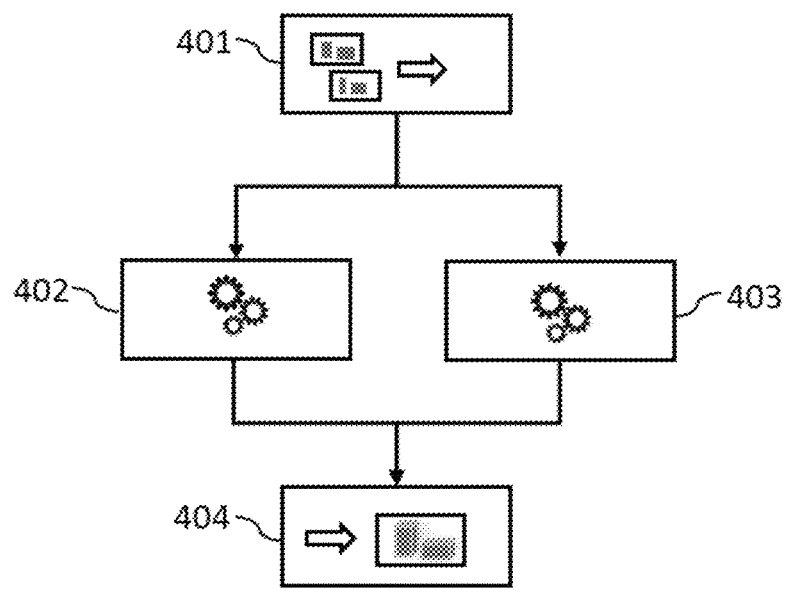

[Fig. 5]
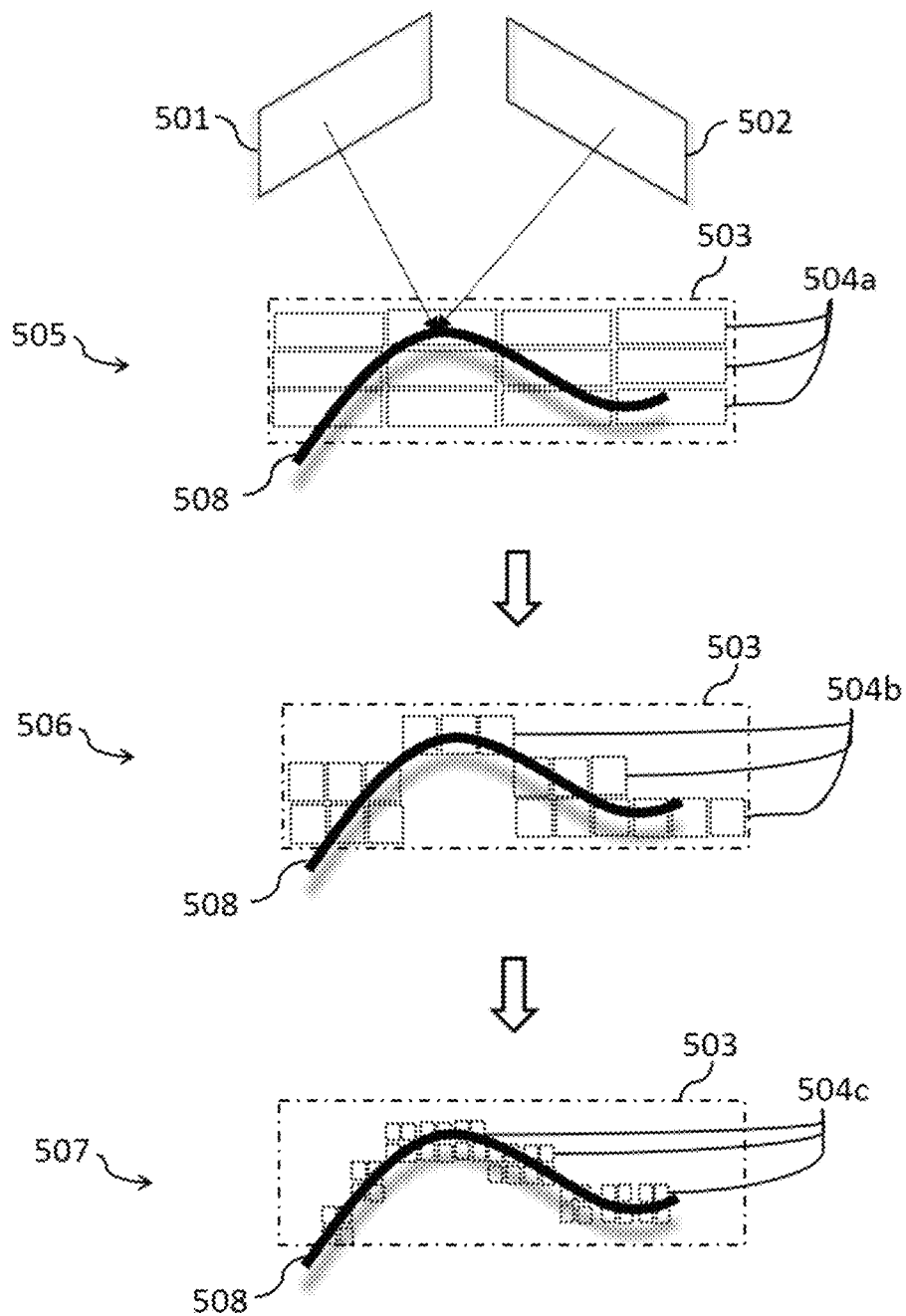

[Fig. 6]
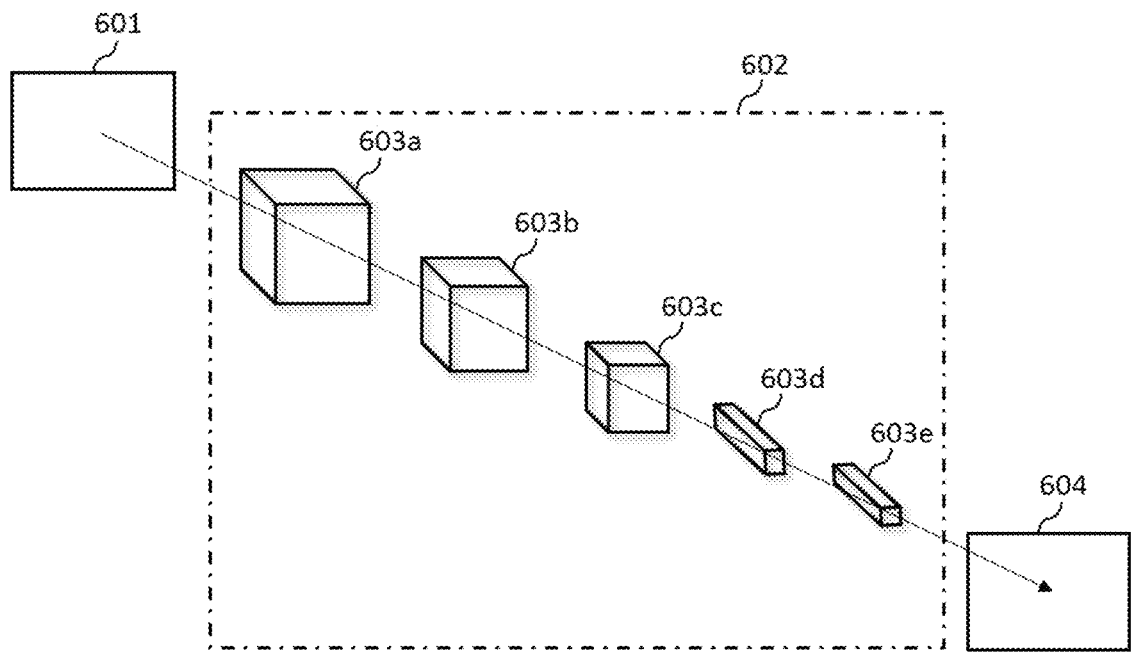
[Fig. 7]
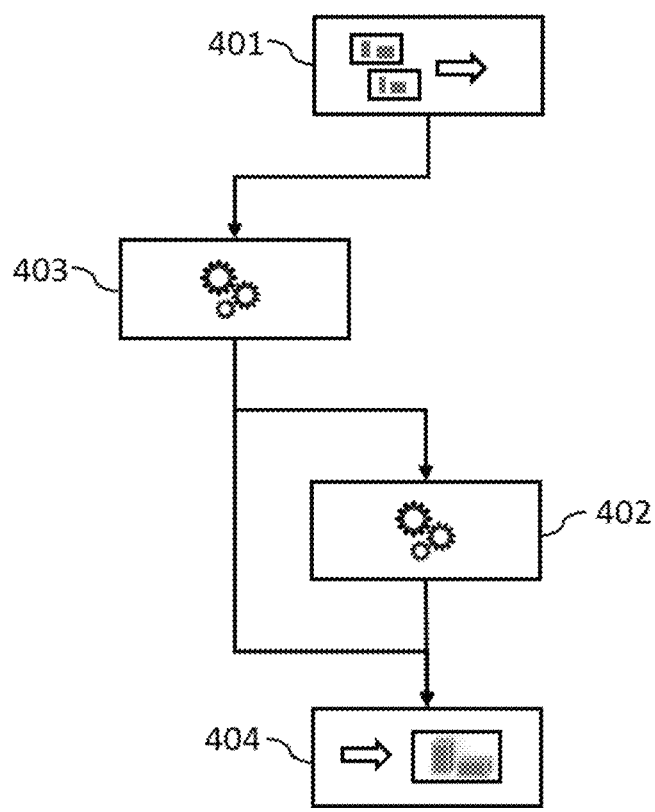

DYNAMIC THREE-DIMENSIONAL IMAGING METHOD

CROSS-REFERENCE TO RELATED APPLICATIONS

This application is a § 371 national phase entry of International Application No. PCT/IB2020/050838, filed Feb. 3, 2020, which claims priority to French Patent Application No. 1901013, filed Feb. 1, 2019.

TECHNICAL FIELD

The present invention relates generally to three-dimensional imaging. It relates more particularly to a three-dimensional imaging method allowing the dynamic reconstruction of a three-dimensional numerical model from several two-dimensional digital images of a given three-dimensional scene.

STATE OF THE ART

At this time, there are several methods which make it possible to generate a three-dimensional numerical model to represent any three-dimensional scene. Among these methods, the so-called stereoscopic reconstruction method and the so-called learning reconstruction method are particularly interesting for industrial applications targeting the general public, because they use two-dimensional digital image streams which come from passive image sensors in order to reconstruct a three-dimensional numerical model of the scene.

FIG. 1 is a diagram of steps illustrating, in a simplified manner, the steps which are common to the two aforementioned methods, which allow the generation of a three-dimensional numerical model from two-dimensional digital images. These methods are carried out according to an iterative approach in which each iteration makes it possible to generate a three-dimensional numerical model which enriches and completes the three-dimensional model established, where appropriate, during a previous iteration.

After step 101 of receiving one or more two-dimensional digital images representing a given three-dimensional scene, steps 102 and 103 consist respectively of a so-called position estimation phase, and a so-called three-dimensional information estimation phase. On the one hand, the position estimation phase consists in determining, at a given instant t, the position of the image sensor(s) used to acquire the two-dimensional digital images with respect to the three-dimensional numerical model already established at this instant t. In a manner known per se, such a determination is carried out by optimizing a criterion taking into account both the two-dimensional images and the three-dimensional model (for example, by two-dimensional or three-dimensional resection or by optimizing a photometric criterion). On the other hand, the three-dimensional information estimation phase consists in calculating, by calculations specific to each of two methods, a three-dimensional numerical model from the two-dimensional images received at the same instant t.

Finally, during step 104, the three-dimensional information obtained at the end of the three-dimensional reconstruction calculation is added to the three-dimensional numerical model already established, taking into account the real position of the image sensors. This information can, where appropriate, modify certain characteristics of the model already established in order to refine its precision.

Beyond the aspects which are common to both methods, each has its own advantages and disadvantages.

On the one hand, the stereoscopic three-dimensional reconstruction calculation method does not require any information prior to its application and can adapt to a very wide variety of three-dimensional scenes. However, its performance is dependent on the particular type of scene observed. In particular, when areas of the observed scene are without texture or have reflections or occlusions, the reconstruction performance of the method is significantly degraded. In addition, a significant limitation of the method is linked to the fact that it is imperative to use at least two separate two-dimensional images to be able to generate a three-dimensional model representing any three-dimensional scene.

On the other hand, the method of three-dimensional reconstruction calculation by learning relies on specific algorithms (such as for example algorithms based on deep neural networks) to generate three-dimensional numerical models from a single or several two-dimensional digital images. These algorithms can be trained, that is to say, they can improve their performance owing to a learning process during which an algorithm is confronted with a large and varied set of two-dimensional images associated with determined three-dimensional models. Advantageously, this method is therefore applicable indifferently to any type of scene. Its performance depends essentially only on the quality of the learning carried out previously, and the data used during this learning. However, an object or a scene that has not been integrated into the learning process will only be reconstructed incompletely, if at all. In addition, in general, the precision of a three-dimensional model generated by this method remains, at the present time, lower than the precision of such a model generated by the stereoscopic three-dimensional reconstruction calculation method.

Document WO2018/039269A1 discloses a device using several image sensors on augmented reality glasses. This device uses the acquired two-dimensional images to determine the position of the device with respect to its environment via a learning calculation method and to perform a dynamic three-dimensional reconstruction of an observed scene. The accuracy of the reconstructed three-dimensional model is not, however, an issue in this application. It should also be noted that the device uses only one of the two methods discussed above.

SUMMARY OF THE INVENTION

The invention aims to eliminate, or at least mitigate, all or part of the aforementioned drawbacks of the prior art.

To this end, a first aspect of the invention proposes a dynamic three-dimensional imaging method comprising the following steps, executed by a calculating unit:
  receiving at least two two-dimensional digital images representing an observed three-dimensional scene, acquired by at least one determined image sensor from at least two respective positions in space;
  generating, from the two-dimensional digital images, based on a stereoscopic three-dimensional reconstruction calculation method, a first intermediate three-dimensional numerical model associated with the observed three-dimensional scene;
  generating, from the two-dimensional digital images, based on a method of three-dimensional reconstruction calculation by learning, a second intermediate three-dimensional numerical model associated with the observed three-dimensional scene;

generating a final three-dimensional numerical model by combining the first and second intermediate three-dimensional numerical models, with said generation comprising selecting, for a determined portion of the final three-dimensional numerical model, the corresponding portion of that of the first and second intermediate three-dimensional numerical models which maximizes a quality criterion of the representation of the observed three-dimensional scene based on a comparison of at least one characteristic parameter of said first and second intermediate three-dimensional numerical models for said portion which is representative of the quality of the representation of the observed three-dimensional scene;

storing, in a memory, digital information comprising at least one received two-dimensional digital image, the final three-dimensional numerical model associated with said two-dimensional digital image and a characteristic parameter of said final three-dimensional numerical model, representative of the quality of the representation of the observed three-dimensional scene; and using the stored digital information as training data for training and retraining the calculating unit to perform the method of three-dimensional reconstruction calculation by learning.

Owing to the invention, it is possible to optimally combine two different three-dimensional reconstruction calculation methods in order to generate a final three-dimensional numerical model that is as faithful as possible. This combination goes far beyond a simple choice between two methods of generating a 3D model which may be known to be equivalent alternatives to each other. It allows real synergy, in particular in the case of embodiments in which the second intermediate three-dimensional numerical model generated can be used as an a priori for generating the first intermediate three-dimensional numerical model by the stereoscopic three-dimensional reconstruction calculation method, even though this embodiment remains a non-mandatory option. Indeed, in some embodiments, not only does the method by stereoscopy feed the learning, but the method by dynamic learning also provides an a priori for the implementation of the method by stereoscopy.

In addition, the method is self-enriching in the sense that each new model generated makes it possible to train or retrain the learning algorithm by at least partially using the results obtained by a stereoscopic method, within a framework of unsupervised learning. The stereoscopic method is able to generate three-dimensional models even on 3D scenes that were not included in the initial learning. These new generated models can therefore constitute a new subset, which can be added to the initial learning data to carry out relearning. This will be richer than the initial learning, since the new three-dimensional models were not yet taken into account. This makes it possible to improve the overall performance of the method in a self-enriching process where learning or relearning guides the stereoscopy without being essential thereto, and the stereoscopy provides new data for relearning as and when it is used.

Embodiments taken alone or in combination further provide that:

the method further comprises acquiring, by at least one determined image sensor, preferably a passive video sensor of the CMOS type or of the CCD type, two-dimensional digital images representing the observed three-dimensional scene;

the method further comprises displaying the final three-dimensional numerical model by a display device such as a two-dimensional scanning or LED display screen, virtual or augmented reality glasses, or a three-dimensional display screen;

the generation of the final three-dimensional numerical model by combining the first and second intermediate three-dimensional numerical models comprises the following:

if only the first or the second intermediate three-dimensional numerical model has a value for a voxel modeling a given portion of the representation of the observed three-dimensional scene, then this value is assigned to the final three-dimensional numerical model;

if both the first and the second three-dimensional numerical model have a value for a voxel modeling a given portion of the representation of the observed three-dimensional scene, then the value assigned to the final three-dimensional numerical model is selected from these two respective values based on the comparison of at least one characteristic parameter of said three-dimensional numerical models which is associated with the value of this voxel; and if no three-dimensional numerical model has a value for a voxel modeling a given portion of the representation of the observed three-dimensional scene, then no value is assigned to this voxel or the value assigned to this voxel is determined according to a smoothing calculation method;

the generation of the second intermediate three-dimensional numerical model is carried out prior to the generation of the first intermediate three-dimensional numerical model, and the second generated intermediate three-dimensional numerical model is used as an a priori for the generation of the first intermediate three-dimensional numerical model by the stereoscopic three-dimensional reconstruction calculation method;

the characteristic parameter of the three-dimensional numerical models is the uncertainty associated with each of the values of said three-dimensional numerical models;

the learning data used by the calculating unit to train and retrain the method of three-dimensional reconstruction calculation by learning comprise:

data from databases, shared or not, comprising two-dimensional digital images and associated three-dimensional numerical models; and/or data comprising two-dimensional digital images and associated three-dimensional numerical models resulting from the execution of the method by another calculating unit; and/or data comprising two-dimensional digital images and associated three-dimensional numerical models resulting from the execution of another method by a calculating unit.

each intermediate three-dimensional numerical model is either a depth map or a three-dimensional point cloud;

during one or more steps of generating intermediate three-dimensional numerical models, a second remote calculating unit cooperates with the calculating unit to generate said one or more intermediate three-dimensional numerical models;

the received two-dimensional digital images are color digital images and wherein the final generated three-dimensional numerical model comprises textures determined based on the colors of said two-dimensional digital images;

during one or more steps of generating intermediate three-dimensional numerical models, the three-dimensional reconstruction calculations carried out use a foveated imaging-type calculation model to obtain an intermediate three-dimensional numerical model which is relatively more precise on the part of said model which projects onto the center of the image and relatively less precise on the part of said model which projects onto the periphery of the image.

In a second aspect, the invention also relates to a calculating unit, comprising hardware and software means for executing all the steps of the method according to the preceding aspect.

A last aspect of the invention relates to a three-dimensional imaging device comprising at least one digital image sensor, a memory and a calculating unit according to the preceding aspect.

BRIEF DESCRIPTION OF THE FIGURES

Other features and advantages of the invention will become apparent on reading the description which follows. This is purely illustrative and should be read in conjunction with the accompanying drawings, in which:

FIG. 1 is a diagram of steps illustrating, in a simplified manner, the steps which are common to the various known three-dimensional reconstruction calculation methods for generating a three-dimensional numerical model of a scene;

FIG. 2 is a schematic representation of a system in which an embodiment of the method according to the invention can be carried out;

FIG. 3 is a functional diagram of a device for implementing the method according to the invention;

FIG. 4 is a diagram of steps illustrating, in a simplified manner, the steps of an embodiment of the method according to the invention; and FIG. 5 is a schematic illustration of the iterative process of the stereoscopic three-dimensional reconstruction calculation method;

FIG. 6 is a schematic illustration of the method of three-dimensional reconstruction calculation by learning;

FIG. 7 is a diagram of steps illustrating, in a simplified manner, the steps of another embodiment of the method according to the invention.

DESCRIPTION OF THE EMBODIMENTS

In the description of embodiments which will follow and in the figures of the accompanying drawings, the same or similar elements bear the same reference numerals in the drawings.

Embodiments of the dynamic three-dimensional imaging method according to the invention will now be described with reference to FIG. 2, FIG. 3 and FIG. 4.

In the context of the embodiments of the present invention, the term "dynamic" denotes the fact that the method can be executed continuously by a calculating unit, for example in an iterative manner. In particular, each new acquisition of an image or of two-dimensional digital images representing a given three-dimensional scene can lead to the execution of steps of the method. Each execution (i.e. each iteration) of the method results in the generation of a three-dimensional numerical model representing the three-dimensional scene. In other words, the three-dimensional numerical model generated during a given iteration of the method constitutes, where appropriate, the update of the three-dimensional numerical model generated during a previous iteration of the method, for example during the previous iteration.

Moreover, those skilled in the art will appreciate that the expression "three-dimensional scene" denotes, as extensively as possible, any element or any combination of elements from the real world, capable of being observed by the acquisition of one or more two-dimensional digital images by one or more digital image sensors. These elements comprise, but are not limited to, one or more among large or small objects, figures or animals, landscapes, places, buildings seen from the outside, rooms or spaces in buildings, etc.

During a first step 401, the calculating unit 203 receives data corresponding to two-dimensional digital images, acquired by the image sensors 202a, 202b and 202c. All these two-dimensional digital images are representations of the same observed three-dimensional scene, in this case the three-dimensional scene 201, from respective positions in space, that is to say, different from each other. In other words, each sensor acquires a two-dimensional digital image representing the three-dimensional scene 201 from a particular viewing angle, different from that of the other two-dimensional digital images of the scene which are available.

In the example shown in FIG. 2 and FIG. 3, the three image sensors 202a, 202b and 202c form an acquisition unit 202 which repeatedly acquires a trio of digital images representing the three-dimensional scene 201 from different points of view (i.e., from different viewing angles). Those skilled in the art will nevertheless appreciate that the number of image sensors used is not limited to three and must simply be greater than or equal to one. In fact, the various three-dimensional reconstruction calculation methods implemented in the rest of the method may, in order to be operational, either require only one two-dimensional image, or use several two-dimensional images of the same scene having been acquired by a single image sensor at different moments in time and from different viewing angles, or else by a plurality of image sensors oriented differently toward the concerned scene.

In general, the image sensors used to acquire two-dimensional digital images can be any digital sensor conventionally used for this type of acquisition. For example, they may be passive video sensors of the CMOS (Complementary Metal-Oxide-Semiconductor) type or of the CCD (Charge-Coupled Device) type. In addition, these sensors can be integrated into an image acquisition device accessible to the general public, such as a video camera, a smartphone or even augmented reality glasses. Finally, in certain embodiments of the method, these sensors acquire digital images which are in color, and said colors make it possible to integrate textures into the three-dimensional numerical model generated by the implementation of the method. In this way, the final rendering obtained is more faithful to the observed three-dimensional scene.

The calculating unit 203 comprises hardware and software means which allow it to execute the various steps of the method. Typically, such a calculating unit comprises a motherboard, a processor and at least one memory. In addition, in particular embodiments, the image sensor(s) and the calculating unit can be integrated into the same device or apparatus. For example, this device can be a smartphone which acquires two-dimensional digital images which are directly processed by its calculating unit. Advantageously, the transfer of the data associated with the images is thus simple and secure.

In a variant of the method not shown, certain steps, and in particular the steps described below, can be executed in whole or in part by a second remote calculating unit which cooperates with the calculating unit 203. For example, the calculating unit 203 can exchange data (in particular image data) with a remote calculator. Advantageously, this makes it possible to increase the available computing power and, consequently, the execution speed of the steps of the concerned method. In addition, such data can be transmitted according to a protocol suitable for this type of communication, such as the HTTP protocol, for example.

During step 402, the calculating unit 203 generates a first intermediate three-dimensional numerical model from the two-dimensional digital images that it has received. This first intermediate three-dimensional numerical model is a 3D representation of the observed three-dimensional scene. In an example of a non-limiting embodiment, this intermediate three-dimensional numerical model can be a depth map or a three-dimensional point cloud. In all cases, it is generated by means of a so-called stereoscopic three-dimensional reconstruction calculation method. In particular, the calculating unit 203 integrates a sub-unit called the stereoscopic reconstruction sub-unit 203a specifically dedicated to the reconstruction of the three-dimensional numerical model according to this calculation method.

As has already been said in the introduction, such a method is known per se to those skilled in the art. It is based in particular on observing the same three-dimensional scene from at least two different angles in order to be able to reconstruct a three-dimensional model of the scene. An example of using this method is described in the article "*StereoScan: Dense 3D Reconstruction in Real-time*," Geiger & al, 2011. In addition, there are many algorithms applying this method which are free to use, and grouped in libraries such as, for example, the library which can be found at: http://www.cvlibs.net/software/libviso/.

Such a calculation method does not require an a priori in order to be able to reconstruct a three-dimensional numerical model from two-dimensional digital images. In other words, a three-dimensional model can be obtained based only on two-dimensional images without any other data being previously known and used by the calculation method.

Nonetheless, where appropriate, the use of an a priori, i.e. of data which serve as the starting point for the stereoscopic reconstruction calculation, allows a gain in calculation time and improves the precision of the method. Indeed, such a calculation method proceeds iteratively by progressively reducing the dimensions of areas of interest of the calculation (i.e. volumes) within which the three-dimensional surfaces of the various elements which make up the observed three-dimensional scene are reconstructed. Using an a priori therefore makes it possible to target the areas in question more precisely and more quickly.

FIG. 5 is a schematic description of the iterative process of a stereoscopic three-dimensional reconstruction calculation method.

In the illustrated example, the two image sensors 501 and 502 acquire two-dimensional digital images representing the same three-dimensional surface 508 (which itself is comprised in a larger observed three-dimensional scene).

To best estimate the shape of the surface 508, the calculations are carried out in a search volume 503 which delimits an area of interest of the calculation. A first estimate 505 of this shape (i.e. a first iteration of the calculation) is carried out in this volume. In particular, within the volume 503, the calculation method is applied in voxels 504a (i.e. volumetric sub-divisions of the three-dimensional space in which the scene is integrated). For each of these voxels 504a, a photometric quantitative index is calculated, for example an index of the NCC (Normalized Cross Correlation) type. The second estimate 506 is then carried out only in the voxels where the quantitative photometric index is greater than a determined value. In particular, said selected voxels 504a are subdivided into a plurality of smaller voxels 504b within each of which a new estimation is done.

The final estimation 507 occurs after a determined number of iterations which is sufficient to achieve an expected level of precision in the estimation of the shape of the three-dimensional surface. In particular, the precision obtained results directly from the size of the voxels 504c used during the final estimation. A three-dimensional numerical model representing, among other things, the three-dimensional surface is then generated from this final estimate.

Referring now to FIG. 4, step 403 consists in generating, via the calculating unit 203, a second intermediate three-dimensional numerical model from the two-dimensional digital images that it has received. This second intermediate three-dimensional numerical model is also a representation of the observed three-dimensional scene. In addition, in the case of the three-dimensional numerical model generated by a learning calculation method, the model can only be a depth map. The latter can, however, be easily converted subsequently, according to a method known per se to those skilled in the art, into a three-dimensional point cloud.

However, unlike the first intermediate three-dimensional numerical model described above, this model is generated by means of a method of three-dimensional reconstruction calculation by learning. In particular, the calculating unit 203 integrates a sub-unit called the reconstruction by learning sub-unit 203b, which is specifically dedicated to the reconstruction of the three-dimensional numerical model according to this calculation method.

Here again, as has already been said in the introduction, such a method is known per se to a person skilled in the art such that describing it in detail would go beyond the scope of the present description. Those skilled in the art will appreciate that the implementation of this method is based in particular on prior learning (also called training). During this learning, the implementation of the method uses a large database in which many two-dimensional digital images are already associated with three-dimensional numerical models. An example of the use of this method is described for example in the article "*Deeper depth prediction with fully convolutional residual networks*," Laina & al, 2016. In addition, there are also many algorithms applying this method which are free to use, and grouped in libraries such as, for example, the library which can be found at: https://github.com/iro-cp/FCRN-DepthPrediction.

Those skilled in the art will appreciate that the order of steps 402 and 403 is irrelevant, and is not limited to the example considered here with reference to the step diagram of FIG. 4.

FIG. 6 is a schematic description of an example of the training process of a method of three-dimensional reconstruction calculation by learning.

In the example shown in FIG. 6, the calculation method is based on a deep learning neural network or DNN (Deep Neural Network) 602 to reconstruct a three-dimensional numerical model 604 from a single two-dimensional digital image 601. This network can learn, from a training set (i.e.

from a database) coupling each determined two-dimensional digital image with a given three-dimensional numerical model, the weights to be given to each learning layer so as to predict the three-dimensional numerical models as precisely as possible from the associated two-dimensional digital image. Once the neural network is trained, it can be used predictively. Thus, advantageously, this method requires only one image of an observed scene to be able to generate a three-dimensional numerical model of the scene in question.

The process of learning such a DNN is known per se to those skilled in the art. FIG. 6 illustrates an example of such a process, in a simplified manner. The first phase of the learning implements three layers of convolution 603a, 603b and 603c, successively. With each implementation of these convolution layers after the first, the size of the convolution matrix which is respectively associated with them (also referred to as kernel) is reduced compared to the implementation of the previous layer. The second phase involves implementing two layers of fully connected neural networks 603d and 603e. The final layer 603e is fully connected to the final depth map.

Returning to the description of FIG. 4, in step 404, the calculating unit 203 calls on a decision-making unit 203c to generate a final three-dimensional numerical model, through a combination of the first and second intermediate three-dimensional numerical models. In particular, the calculating unit 203 is suitable for selecting each portion of the final three-dimensional numerical model to be generated, either in the first intermediate three-dimensional numerical model or in the second intermediate two-dimensional numerical model, as a function of a quality criterion of the representation of the observed three-dimensional scene, based on a comparison of at least one characteristic parameter of said first and second intermediate three-dimensional numerical models. The characteristic parameter is representative of the quality of the representation of the observed three-dimensional scene. In other words, the calculating unit selects the corresponding portion of that of the first and second intermediate three-dimensional numerical models (generated respectively by the stereoscopic calculation method and the learning calculation method) which maximizes the criterion of the quality of the representation of the observed three-dimensional scene based on a comparison of the characteristic parameter of said first and second intermediate three-dimensional numerical models for said portion.

The criterion of the quality of the representation of the observed scene makes it possible each time, that is to say, for each portion of the final three-dimensional numerical model to be generated, to select the intermediate three-dimensional numerical model which most accurately represents the observed three-dimensional scene. Of the two intermediate three-dimensional numerical models, this is the one for which the corresponding portion maximizes this quality criterion. In some embodiments, this result can be obtained by comparing a characteristic parameter which is common to the two models, on the basis of which a portion of one or a portion of the other of said intermediate models, respectively, is selected according to the result of the comparison, with these portions corresponding to the considered portion of the final model to be generated, that is to say, the portion which models the same part of the observed scene.

For example, in a particular embodiment of the method, the characteristic parameter of the intermediate three-dimensional numerical models may be the uncertainty associated with each of the values which have been determined (i.e. during steps 402 and 403 of the method) for each three-dimensional numerical model. More precisely, the decisional unit is adapted to compare the known uncertainty between the two models for each voxel of the intermediate models which are respectively associated with a same determined point in space of the observed three-dimensional scene.

In such an embodiment, it can be provided as follows:
if only the first or the second intermediate three-dimensional numerical model has a value for a given voxel of the observed three-dimensional scene, then it is this value which is assigned to the final three-dimensional numerical model;
if both the first and the second intermediate three-dimensional numerical model have a value for a given voxel of the observed three-dimensional scene, then the value assigned to the final three-dimensional numerical model is selected from these two respective values based on the comparison of the respective uncertainties of the two three-dimensional numerical models which are associated with the value of this voxel; and finally
if no intermediate three-dimensional numerical model has a value for the given voxel of the observed three-dimensional scene, then no value is assigned to this voxel, or in a variant, the value assigned to this voxel is determined according to a so-called smoothing calculation method. One such method consists in interpolating the value of an element based on the values of neighboring voxels in the observed three-dimensional scene.

In conclusion, the method makes it possible to optimize the precision of the obtained final three-dimensional numerical model by combining the respective qualities of two different approaches. The model is thus as faithful as possible to the three-dimensional scene actually observed.

Those skilled in the art will appreciate that the invention can be generalized to more than two intermediate three-dimensional numerical models, and to more than two two-dimensional images of the observed three-dimensional scene. For example, a plurality of intermediate three-dimensional numerical models of either of the types contemplated in the above can be generated from respective two-dimensional digital image p-tuples, where p is an integer greater than or equal to one. In addition, types of intermediate three-dimensional numerical models other than the two types described in the foregoing can be envisaged, depending on the specific features of each application.

In addition, in particular embodiments of the method, the final three-dimensional numerical model can be returned to a user via a display device. For example, the model can be projected on a two-dimensional scanning or LED display screen, on virtual or augmented reality glasses, or even on a three-dimensional display screen.

Finally, to reduce the duration of the calculations carried out during the steps of generating three-dimensional numerical models, the calculations intrinsic to the calculation methods can be carried out according to a calculation model of the foveated imaging type. The term "foveated imaging," by analogy with human vision, refers to a calculation model which aims to obtain a more precise result at the center of the image or of the calculated model, and less precise at the periphery. The computing power can thus be reduced at the periphery and lead to a saving of resources and therefore a reduction in the overall calculation time.

In addition to the advantages already described, other advantages of the method according to the invention result from the fact that combining two different calculation methods additionally makes it possible to make the two methods cooperate with each other in order to improve their respective performances.

For example, firstly, it is possible to store, in a memory, the digital information obtained at the end of an iteration of the method in order to use it to improve the performance of the method during a following iteration, that is to say, to generate another final three-dimensional numerical model of another observed scene or of the same observed scene considered, for example, from another point of view. More precisely, the calculating unit 203 can transfer, to a memory 205, a set of data comprising the two-dimensional digital images that it has received, the final three-dimensional numerical model associated with said two-dimensional digital images, and one or more parameters characteristic of this model. In this way, the digital information thus stored can be reused by the calculating unit as learning data allowing it to train, or retrain if necessary, the calculating unit for this method of three-dimensional reconstruction calculation by learning. Thus, advantageously, in addition to the database initially used to train the calculating unit, each new iteration of the method completes and enriches the learning of the calculating unit for the continuous implementation of the method and, as a result, its level of performance.

In addition, in particular embodiments of the method, the data described above and/or other additional data can help to refine the learning of the calculating unit during a phase referred to as the relearning phase. For example, it may be data from an automobile manufacturer providing a set of digital images representing a vehicle in association with three-dimensional numerical models of said vehicle which are predefined based on said images. It can also be data resulting from the execution of the same method by another comparable calculating unit (for example, via another device or by another user), or even data originating from the execution of another method unrelated to that of the invention (for example, a laser acquisition of a three-dimensional scene) but also leading to the generation of a three-dimensional numerical model from two-dimensional digital image (s). In addition, this data can also come from a learning data sharing platform capable of aggregating such data from multiple sources. In all cases, the three-dimensional reconstruction calculation method can be retrained regularly in order to improve its performance level. Reference is made in particular to self-enrichment of the method. Indeed, advantageously, each iteration of the method is capable of improving its performance.

Secondly, as has already been said above, the stereoscopic three-dimensional reconstruction calculation method can benefit from the use of an a priori in carrying out its calculations. Thus, insofar as the method of three-dimensional reconstruction calculation by learning was trained prior to any concrete implementation (iteration) of the method, owing to the use of a specific database referred to as the learning database, the latter is able to provide, if appropriate, a three-dimensional numerical model that can serve as an a priori for the stereoscopic three-dimensional reconstruction calculation method.

FIG. 7 is a diagram of steps of a particular embodiment of the method which uses this possibility.

In this embodiment, each of steps 401 to 404 which have already been described with reference to FIG. 4 are reproduced. However, the chronology of the unfolding of these steps is specific. In particular, step 403 for generating the second intermediate three-dimensional numerical model is carried out prior to step 402 for generating the first intermediate three-dimensional numerical model. In this way, the generated second intermediate three-dimensional numerical model is used as an a priori by the stereoscopic three-dimensional reconstruction calculation method to generate its three-dimensional numerical model more precisely and more quickly. For example, with reference to the iterative process of a stereoscopic three-dimensional reconstruction calculation method shown in FIG. 5, the use of such an a priori would make it possible to start directly at the estimation step 506 or at any other later estimation step which is more precise than the estimation step 505. In addition, step 404 of the method remains unchanged, and the final three-dimensional numerical model remains a combination of the two intermediate models exploiting, in all cases, for each portion of the final model, the intermediate model which is the most precise (i.e. the most faithful to the observed three-dimensional scene).

The present invention has been described and illustrated in the present detailed description and in the figures of the accompanying drawings, in possible embodiments. The present invention is not, however, limited to the embodiments presented. Other variants and embodiments can be deduced and implemented by a person skilled in the art on reading the present description and the accompanying drawings.

In the claims, the term "comprising" or "including" does not exclude other elements or other steps. A single processor or several other units can be used to implement the invention. The various features presented and/or claimed can advantageously be combined. Their presence in the description or in different dependent claims does not exclude this possibility. The reference signs cannot be understood as limiting the scope of the invention.

The invention claimed is:

1. A dynamic three-dimensional imaging method comprising the following steps, executed by a calculating unit:
   receiving at least two two-dimensional digital images representing an observed three-dimensional scene, acquired by at least one determined image sensor from at least two respective positions in space;
   generating, from the two-dimensional digital images, based on a stereoscopic three-dimensional reconstruction calculation method, a first intermediate three-dimensional numerical model associated with the observed three-dimensional scene;
   generating, from the two-dimensional digital images, based on a method of three-dimensional reconstruction calculation by learning, a second intermediate three-dimensional numerical model associated with the observed three-dimensional scene;
   generating, by combination of the first and second intermediate three-dimensional numerical models, a final three-dimensional numerical model, with said generation comprising selecting, for a determined portion of the final three-dimensional numerical model, a corresponding portion of that of the first and second intermediate three-dimensional numerical models which maximizes a quality criterion of the representation of the observed three-dimensional scene based on a comparison of at least one characteristic parameter of said first and second intermediate three-dimensional numerical models for said corresponding portion which is representative of the quality of the representation of the observed three-dimensional scene;
   storing, in a memory, digital information comprising at least one received two-dimensional digital image, the final three-dimensional numerical model associated with said two-dimensional digital image, and a characteristic parameter of said final three-dimensional numerical model, representative of the quality of the representation of the three-dimensional scene observed; and, using stored digital information as learning data to train and retrain the calculating unit for the execution of the method of three-dimensional reconstruction calculation by learning.

2. The method according to claim 1, further comprising an acquisition, by at least one determined image sensor, of two-dimensional digital images representing the observed three-dimensional scene.

3. The method according to claim 1, further comprising displaying the final three-dimensional numerical model, by a display device.

4. The method according to claim 1, wherein generating the final three-dimensional numerical model by combining the first and second intermediate three-dimensional numerical models comprises:
   if only the first or the second intermediate three-dimensional numerical model has a value for a voxel modeling a given portion of the representation of the observed three-dimensional scene, then the value is assigned to the final three-dimensional numerical model;
   if both the first and the second three-dimensional numerical model have a value for a voxel modeling a given portion of the representation of the observed three-dimensional scene, then the value assigned to the final three-dimensional numerical model is selected from among these two respective values based on the comparison of at least one characteristic parameter of said three-dimensional numerical models which is associated with the value of this voxel; and
   if no three-dimensional numerical model has a value for a voxel modeling a given portion of the representation of the observed three-dimensional scene, then no value is assigned to this voxel or the value assigned to this voxel is determined according to a smoothing calculation method.

5. The method according to claim 1, wherein the generation of the second intermediate three-dimensional numerical model is carried out prior to the generation of the first intermediate three-dimensional numerical model, and wherein the second generated intermediate three-dimensional numerical model is used as an a priori for the generation of the first intermediate three-dimensional numerical model by the stereoscopic three-dimensional reconstruction calculation method.

6. The method according to claim 1, wherein the characteristic parameter of the three-dimensional numerical models is the uncertainty associated with each of the values of said three-dimensional numerical models.

7. The method according to claim 1, wherein the learning data used by the calculating unit to train and retrain the method of three-dimensional reconstruction calculation by learning comprise:
   data from databases, shared or not, comprising two-dimensional digital images and associated three-dimensional numerical models; and/or
   data comprising two-dimensional digital images and associated three-dimensional numerical models resulting from the execution of the method by another calculating unit; and
   data comprising two-dimensional digital images and associated three-dimensional numerical models resulting from the execution of another method by a calculating unit.

8. The method according to claim 1, wherein each intermediate three-dimensional numerical model is either a depth map or a three-dimensional point cloud.

9. The method according to claim 1, wherein, during one or more steps of generating intermediate three-dimensional numerical models, a second remote calculating unit cooperates with the calculating unit to generate said one or more intermediate three-dimensional numerical models.

10. The method according to claim 1, wherein the received two-dimensional digital images are color digital images and wherein the final generated three-dimensional numerical model comprises textures determined based on the colors of said two-dimensional digital images.

11. The method according to claim 1, wherein, during one or more steps of generating intermediate three-dimensional numerical models, the three-dimensional reconstruction calculations carried out use a foveated imaging-type calculation model to obtain an intermediate three-dimensional numerical model which is relatively more precise on the part of said model which projects onto the center of the image and relatively less precise on the part of said model which projects onto the periphery of the image.

12. A calculating unit, comprising hardware and software means for executing the steps of:
   receiving at least two two-dimensional digital images representing an observed three-dimensional scene, acquired by at least one determined image sensor from at least two respective positions in space;
   generating, from the two-dimensional digital images, based on a stereoscopic three-dimensional reconstruction calculation method, a first intermediate three-dimensional numerical model associated with the observed three-dimensional scene;
   generating, from the two-dimensional digital images, based on a method of three-dimensional reconstruction calculation by learning, a second intermediate three-dimensional numerical model associated with the observed three-dimensional scene;
   generating, by combination of the first and second intermediate three-dimensional numerical models, a final three-dimensional numerical model, with said generation comprising selecting, for a determined portion of the final three-dimensional numerical model, a corresponding portion of that of the first and second intermediate three-dimensional numerical models which maximizes a quality criterion of the representation of the observed three-dimensional scene based on a comparison of at least one characteristic parameter of said first and second intermediate three-dimensional numerical models for said corresponding portion which is representative of the quality of the representation of the observed three-dimensional scene;
   storing, in a memory, digital information comprising at least one received two-dimensional digital image, the final three-dimensional numerical model associated with said two-dimensional digital image, and a characteristic parameter of said final three-dimensional numerical model, representative of the quality of the representation of the three-dimensional scene observed; and, using stored digital information as learning data to train and retrain the calculating unit for the execution of the method of three-dimensional reconstruction calculation by learning.

13. A three-dimensional imaging device comprising at least one digital image sensor, a memory and a calculating unit comprising hardware and software means to perform:
   receiving at least two two-dimensional digital images representing an observed three-dimensional scene, acquired by at least one determined image sensor from at least two respective positions in space;
   generating, from the two-dimensional digital images, based on a stereoscopic three-dimensional reconstruction calculation method, a first intermediate three-dimensional numerical model associated with the observed three-dimensional scene;
   generating, from the two-dimensional digital images, based on a method of three-dimensional reconstruction calculation by learning, a second intermediate three-dimensional numerical model associated with the observed three-dimensional scene;
   generating, by combination of the first and second intermediate three-dimensional numerical models, a final three-dimensional numerical model, with said generation comprising selecting, for a determined portion of the final three-dimensional numerical model, a corresponding portion of that of the first and second intermediate three-dimensional numerical models which maximizes a quality criterion of the representation of the observed three-dimensional scene based on a comparison of at least one characteristic parameter of said first and second intermediate three-dimensional numerical models for said corresponding portion which is representative of the quality of the representation of the observed three-dimensional scene;
   storing, in a memory, digital information comprising at least one received two-dimensional digital image, the final three-dimensional numerical model associated with said two-dimensional digital image, and a characteristic parameter of said final three-dimensional numerical model, representative of the quality of the representation of the three-dimensional scene observed; and,
   using stored digital information as learning data to train and retrain the calculating unit for the execution of the method of three-dimensional reconstruction calculation by learning.

* * * * *